United States Patent
McAllister et al.

(10) Patent No.: US 10,225,102 B2
(45) Date of Patent: Mar. 5, 2019

(54) NETWORK CONNECTIVITY

(71) Applicant: METASWITCH NETWORKS LTD, Enfield, Middlesex (GB)

(72) Inventors: James Peter McAllister, London (GB); Benjamin Thomas Wright, London (GB); Jonathan Eric Hardwick, Chesterfield (GB)

(73) Assignee: Metaswitch Networks Ltd, Enfield (GB)

( * ) Notice: Subject to any disclaimer, the term of this patent is extended or adjusted under 35 U.S.C. 154(b) by 514 days.

(21) Appl. No.: 14/839,182

(22) Filed: Aug. 28, 2015

(65) Prior Publication Data
US 2016/0065450 A1    Mar. 3, 2016

(30) Foreign Application Priority Data
Aug. 28, 2014   (GB) .................................. 1415276.3

(51) Int. Cl.
*H04L 12/46*    (2006.01)

(52) U.S. Cl.
CPC ...... *H04L 12/4625* (2013.01); *H04L 12/4633* (2013.01)

(58) Field of Classification Search
CPC ......... H04L 45/28; H04L 45/22; H04L 45/50; H04L 45/00; H04L 12/462; H04L 12/4625; H04L 41/0663; H04L 41/08; H04L 12/4633; H04L 12/4641; H04L 1/22; H04L 41/06; H04L 43/0811; H04L 45/68; H04L 41/00; H04L 41/0668; H04L 41/069;
(Continued)

(56) References Cited

U.S. PATENT DOCUMENTS 8,787,149 B1   7/2014  Ramanathan et al.
9,019,814 B1 * 4/2015  Mohanty ................. H04L 45/00
                                                        370/219
(Continued)

FOREIGN PATENT DOCUMENTS

WO    2012016458 A1    2/2012

OTHER PUBLICATIONS

Search Report dated Feb. 4, 2015 for Application No. GB1415276.3.

*Primary Examiner* — Yemane Mesfin
*Assistant Examiner* — Mon Cheri S Davenport
(74) *Attorney, Agent, or Firm* — EIP US LLP (57) ABSTRACT

Traffic is transferred between a first consumer network node and a second consumer network node via a local connection established at a first service provider network node. The first service provider network node is connected to the first consumer network node via a first attachment circuit, and to the second network consumer node via a second attachment circuit. A loss in connectivity is detected between the first consumer network node and the second consumer network node via the local connection, and in response, traffic is transferred between the first consumer network node and the second consumer network node via a remote connection. The remote connection includes a pseudowire established between the first service provider network node and a second service provider network node. The second consumer network node is connected to the second service provider network node via a third attachment circuit.

23 Claims, 6 Drawing Sheets

(58) Field of Classification Search
CPC ..... H04L 41/0893; H04L 41/12; H04L 43/10; H04L 43/12; H04L 45/42; H04L 45/44; H04L 47/70; H04L 47/746; H04L 47/825
See application file for complete search history.

(56) References Cited

U.S. PATENT DOCUMENTS

| | | | |
|---|---|---|---|
| 2009/0175280 A1* | 7/2009 | Berechya | H04L 12/4625 370/395.53 |
| 2009/0201831 A1 | 8/2009 | Kumar | |
| 2010/0226246 A1 | 9/2010 | Proulx | |
| 2012/0106360 A1 | 5/2012 | Sajassi | |
| 2012/0147737 A1* | 6/2012 | Taylor | H04L 41/0663 370/219 |
| 2013/0194911 A1 | 8/2013 | Fedyk | |
| 2014/0022890 A1 | 1/2014 | Dong et al. | |

* cited by examiner

Figure 1

PRIOR ART

Figure 2

PRIOR ART

Figure 3

PRIOR ART

NETWORK CONNECTIVITY

CROSS-REFERENCE TO RELATED APPLICATIONS

This application claims priority under 35 U.S.C. § 119(a) to UK Patent Application No. GB 1415276.3, filed on Aug. 28, 2014, the entire content of which is hereby incorporated by reference.

BACKGROUND OF THE INVENTION

Field of the Invention

The present disclosure relates to providing connectivity between networks. In particular, but not exclusively, the present disclosure relates to providing connectivity between consumer network nodes via a service provider network.

Description of the Related Technology

Telecommunications networks, such as computer networks, enable the exchange of data between connected devices, or network nodes, such as computers, servers, routers and the like. A local area network (LAN) may typically provide interconnectivity to a number of devices at a particular geographic location or site, such as a home, office or other building. In order to provide network connectivity between devices at two different sites, a direct connection may be deployed which interconnects the sites, thereby allowing the various network nodes at each site to be part of the same network. Such an arrangement may be employed in an office or university complex for example.

However, use of such a direct connection between sites is not always feasible, for example due to physical constraints, such as a large geographic separation between sites, or for cost reasons. Various methods are known which enable connectivity between two sites which have no direct connection. Data may be exchanged between the network nodes at the remote sites by means of the internet for example. However, for some applications, it is desirable to retain properties offered by a direct connection between the two sites, despite no direct connection being available.

A virtual private wire service (VPWS), also known as a virtual leased line (VLL) may be used to emulate a bidirectional point-to-point link between two sites that have no direct connection between them. Using such a VPWS, the networks at the two sites appear to be directly connected, and the various network nodes may exchange data as though they were part of the same network. In a VPWS, a service provider network is used which interconnects the two sites. The emulated connection between the sites is commonly implemented by means of a 'pseudowire', which is established between nodes in the service provider network, and emulates a direct connection across the service provider network between those nodes. Protection against connectivity problems in the VPWS may be conventionally provided through a technique known as pseudowire redundancy, in which multiple alternative pseudowires may be defined which traverse different paths through the service provider network, and can be used alternatively in case of a failure. However, it would be desirable to provide improved measures for connectivity protection, for example measures that can be utilized in additional or alternative scenarios.

SUMMARY

According to first embodiments, there is a method of providing connectivity between a first consumer network node and a second consumer network node via a service provider network, the method comprising:

transferring traffic between the first consumer network node and the second consumer network node via a local connection established at a first service provider network node in the service provider network, the first service provider network node being connected to the first consumer network node via a first attachment circuit, and to the second network consumer node via a second attachment circuit;

detecting a loss in connectivity between the first consumer network node and the second consumer network node via the local connection; and in response to detecting the loss in connectivity, transferring traffic between the first consumer network node and the second consumer network node via a remote connection, the remote connection comprising a pseudowire established between the first service provider network node and a second service provider network node in the service provider network, the second consumer network node being connected to the second service provider network node via a third attachment circuit.

According to second embodiments, there is a system for use in providing connectivity between a first consumer network node and a second consumer network node via one or more service provider network nodes comprised within a service provider network, the system comprising at least one memory including computer program code; and at least one processor in data communication with the at least one memory, wherein the at least one processor is configured to: transfer traffic between the first consumer network node and the second consumer network node via a local connection established at a first service provider network node in the service provider network, the first service provider network node being connected to the first consumer network node via a first attachment circuit, and to the second network consumer node via a second attachment circuit; detect a loss in connectivity between the first consumer network node and the second consumer network node via the local connection; and in response to detecting the loss in connectivity, transfer traffic between the first consumer network node and the second consumer network node via a remote connection, the remote connection comprising a pseudowire established between the first service provider network node and a second service provider network node in the service provider network, the second consumer network node being connected to the second service provider network node via a third attachment circuit.

According to third embodiments, there is provided a non-transitory computer-readable storage medium comprising computer-executable instructions which, when executed by a processor, cause a computing device to perform the method of the first embodiments.

According to fourth embodiments, there is a system for use in providing connectivity between a first consumer network node and a second consumer network node via a service provider network, the system comprising: a first service provider network node, the first service provider network node being attached to the first consumer network node via a first attachment circuit, and attached to the second consumer network node via a second attachment circuit; a second service provider network node, the second service provider network node being attached to the first consumer network node via a third attachment circuit; at least one memory including computer program code; and at least one processor in data communication with the at least one memory, wherein the at least one processor is configured to: provide a local connection, at the first service provider network node, between the first consumer network node and the second consumer network node, and at least one remote connection between the first consumer network node and the second consumer network node, the remote connection comprising a pseudowire connection established between the first service provider network node and the second service provider network node, wherein the local connection and the at least one remote connection are configured to provide redundant connectivity between the first consumer network node and the second consumer network node.

Further features of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
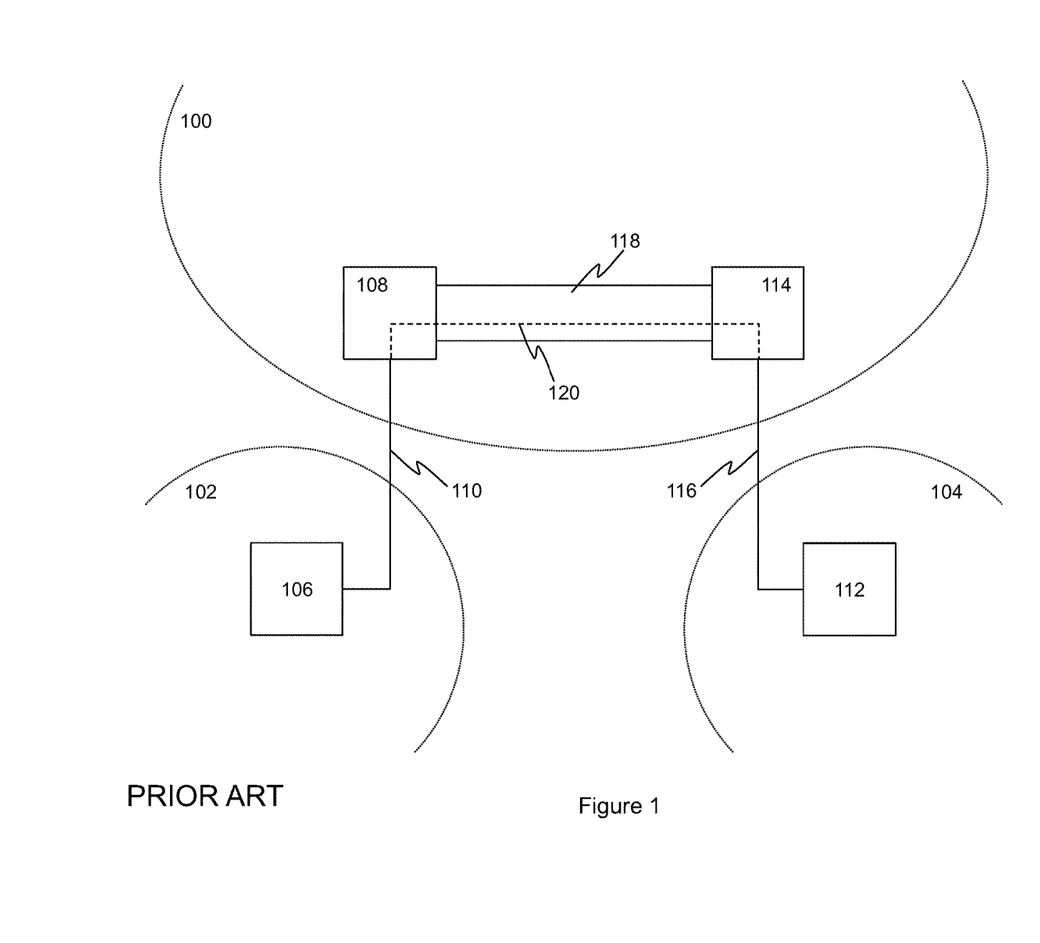
FIG. 1 shows an example implementation of a known virtual private wire service.
Figure 2:
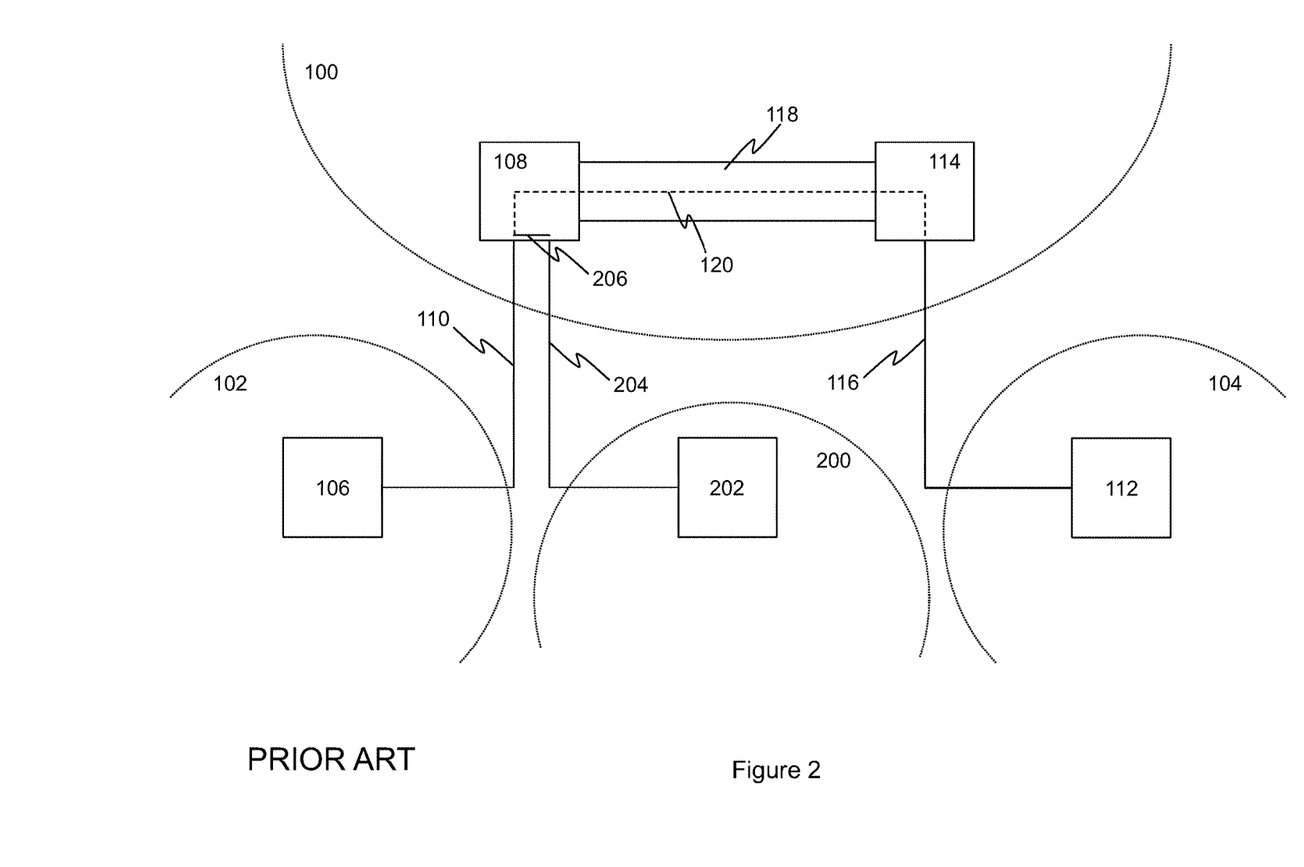
FIG. 2 shows a further example implementation of a known virtual private wire service.
Figure 3:
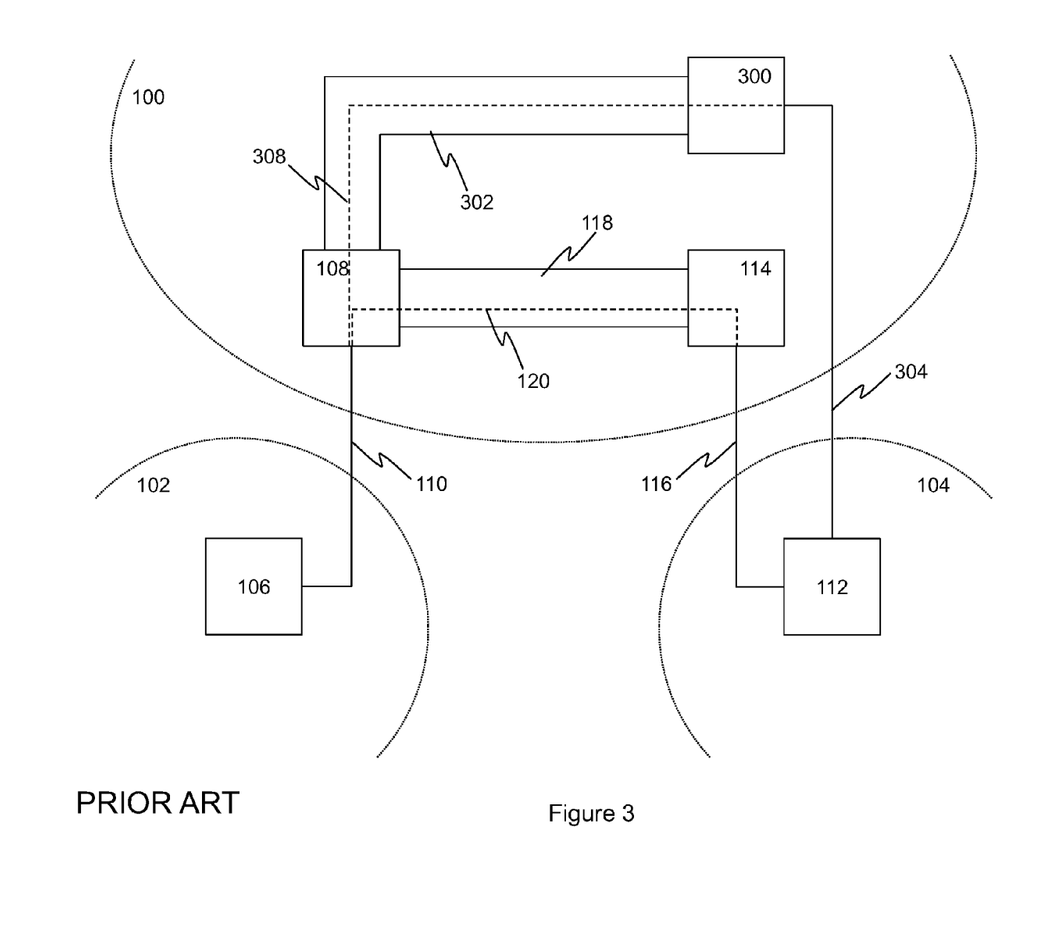
FIG. 3 shows a further example implementation of a known virtual private wire service.

FIGS. 1 to 3 illustrate known networking methods for implementing a virtual private wire service (VPWS), which are described herein to aid in comprehension of the present disclosure.

FIG. 1 illustrates an example implementation of a conventional virtual private wire service (VPWS). Service provider network 100 is used to provide connectivity between consumer network 102 at a first consumer site, and a consumer network 104 at a second consumer site. Consumer network node 106 in consumer network 102 is connected to service provider network node 108 via attachment circuit 110. Similarly, consumer network node 112 in consumer network 104 is connected to service provider network node 114 via attachment circuit 116. Service provider network 100 provides connectivity between the various service provider network nodes 108, 114 that are comprised therein. The connectivity between service provider network nodes 108 and 114 may include a network tunnel 118, established between service provider network nodes 108 and 114.

In order to emulate a direct connection between consumer network node 106 and consumer network node 112, pseudowire 120 is configured which connects attachment circuit 110 to attachment circuit 116, for example via network tunnel 118 established between service provider network node 108 and service provider network node 114. Pseudowire 120 emulates direct connectivity between attachment circuit 110 and attachment circuit 116, and therefore between consumer network node 106 and consumer network node 112.

FIG. 2 illustrates a further example implementation of a conventional VPWS. In arrangements where two consumer network nodes are connected to the same service provider network node, a direct connection between the two consumer network nodes can be emulated without requiring the use of a pseudowire. Entities 100 to 120 of FIG. 2 are the same as described previously in relation to FIG. 1. Additionally, FIG. 2 shows further consumer network node 202, comprised within a further consumer network 200. Consumer network node 202 is connected to service provider network node 108 via attachment circuit 204.

In order to emulate a direct connection between consumer network node 106 and consumer network node 202, a local connection 206 is configured within service provider network node 108 which connects attachment circuit 110 to attachment circuit 204. Such a local connection is also known as a hairpin cross-connect, or a pair of hairpin cross-connects. Local connection 206 emulates direct connectivity between attachment circuit 110 and attachment circuit 204, and therefore between consumer network node 106 and consumer network node 202.

FIG. 3 illustrates a further example implementation of a known VPWS. In arrangements where a consumer network node is connected to more than one service provider network node, pseudowire redundancy can be provided in case of connectivity problems via the first pseudowire connection. Entities 100 to 120 of FIG. 3 are the same as described previously in relation to FIG. 1. FIG. 3 additionally shows a further service provider network node 300 in service provider network 100, which is connected to service provider network node 108, for example by means of network tunnel 302. In the arrangement shown in FIG. 3, consumer network node 112 is further connected to service provider network node 300 via attachment circuit 304.

Connection redundancy is conventionally provided through definition of a pseudowire 'set', which includes two or more pseudowires, each of which are used to provide connectivity between the given consumer network nodes. In FIG. 3, redundant connectivity between consumer network node 106 and consumer network node 112 is provided through the addition of pseudowire 308 which connects attachment circuit 110 to attachment circuit 304, for example via tunnel 302 established between service provider network node 108 and service provider network node 300. Pseudowire 308 emulates direct connectivity between attachment circuit 110 and attachment circuit 304, and therefore between consumer network node 106 and consumer network node 112. Pseudowires 120 and 308 together form a pseudowire set for providing connection redundancy between consumer network node 106 and consumer network node 112. All but one of the pseudowires in a pseudowire set are typically configured as inactive at any given time, with the one or more inactive pseudowires being configured as backup pseudowires. For example, pseudowire 120 may form a primary connection between consumer network node 106 and consumer network node 112, with pseudowire 308 forming a redundant backup connection. Hence, pseudowire 120 is used for communications between consumer network node 106 and consumer network node 112 until a there is a connectivity problem via the primary connection. When such a connectivity problem occurs, the backup connection, including pseudowire 308 is used instead.

Embodiments of the present disclosure will now be described with reference to FIGS. 4 to 6. Embodiments comprise measures, including methods, apparatus, computer program products and systems, for providing redundancy for local, or 'hairpin', connections established at service provider network nodes, that are utilized to interconnect consumer network nodes. Through connection of at least one of the consumer network nodes to two or more nodes in the service provider network, embodiments provide redundancy for the local connection through configuration of a pseudowire to provide an alternate 'remote' connection between the consumer network nodes.

Figure 4:
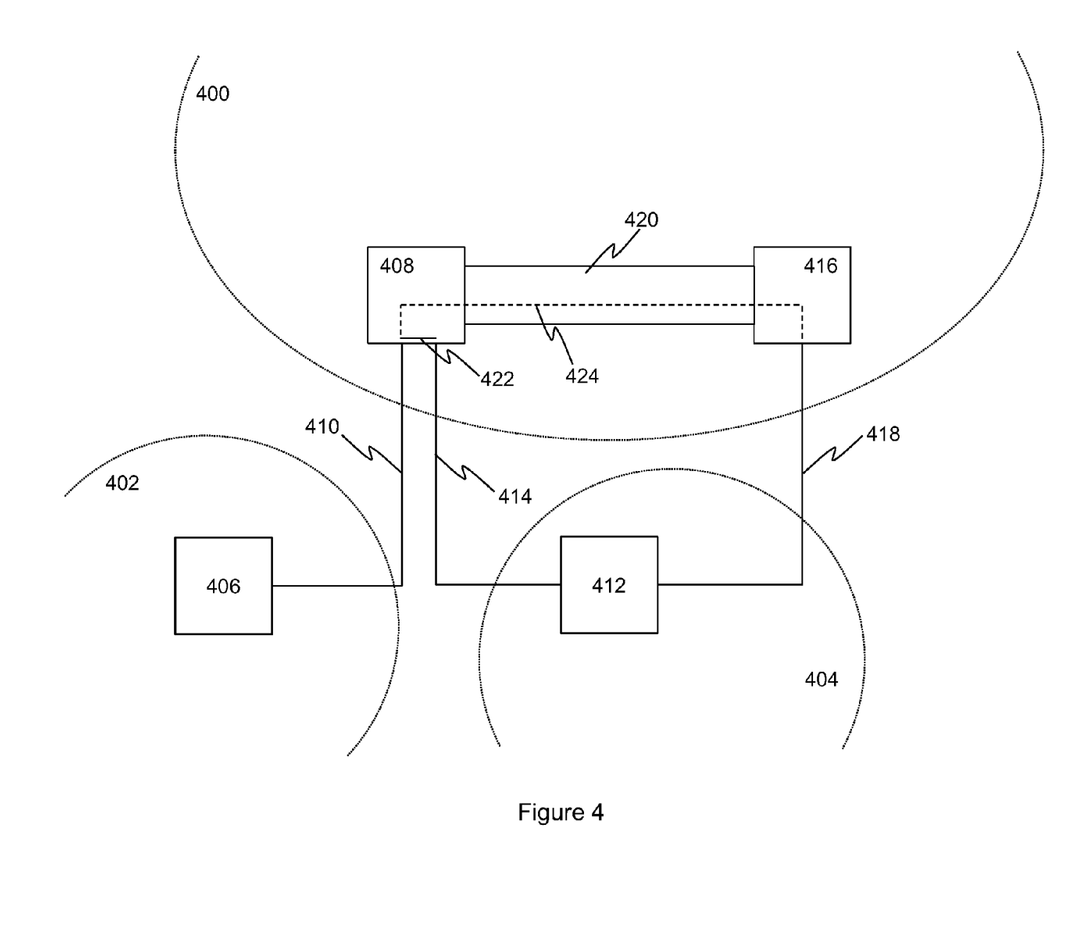
FIG. 4 shows an example implementation of a virtual private wire service according to one or more embodiments of the present invention.

FIG. 4 shows an example implementation of a virtual private wire service (VPWS) according to embodiments. Service provider network 400 provides connectivity between various consumer networks in the VPWS, including consumer network 402 and consumer network 404. Service provider network 400 may comprise a core network, operated by the provider of the VPWS or other internet service provider (ISP) for example. Service provider network 400 may also include, or be interconnected by, one or more further networks, such as the internet. In embodiments, service provider network 400 comprises a packet switched network. In some such embodiments, service provider network 400 comprises an Internet Protocol (IP) network. In further such embodiments, service provider network 400 comprises a Multiprotocol Label Switching (MPLS) network. Service provider network 400 connects consumer networks 402 and 404. Consumer networks 402 and 404 may each be associated with a different geographic location or site, such as a corporate or residential building, area or facility. Networks 402 and 404 may be referred to as consumer networks in so far as they are provided with the virtual private wire service offered by service provider network 400. In embodiments, consumer networks 402 and 404 comprise packet switched networks.

Consumer network 402 includes consumer network node 406, which is capable of communicating with one or more service provider network nodes in service provider network 400. In embodiments, network node 406 may be referred to as an edge node, or Consumer Edge device (CE). In embodiments, consumer network node 406 comprises a host device, such as a personal computer, server, personal digital assistant (PDA), or smartphone for example. In further embodiments, consumer network node 406 comprises a networking node capable of performing one or more networking functions, such as a network router. In embodiments, consumer network node 406 interfaces between one or more service provider network nodes in service provider network 400, and one or more further nodes in consumer network 402 (not shown), such as host devices and/or further networking nodes for example. In the embodiments shown in FIG. 4, consumer network node 406 is capable of communicating with service provider network node 408 via attachment circuit 410. Consumer network node 406 may therefore be referred to as being attached to service provider network node 408, or 'homed' at service provider network node 408.

Attachment circuit 410 provides connectivity between consumer network node 406 and service provider network node 408. In some embodiments, attachment circuit 410 comprises a direct physical link between consumer network node 406 and service provider network node 408. In further embodiments, attachment circuit 410 may traverse one or more intermediate networks (not shown). In embodiments, attachment circuit 410 comprises a network tunnel, which enables communication between consumer network node 406 and service provider network node 408 to traverse one or more intermediary networks while emulating a direct connection between them. Use of a network tunnel additionally may provide a secure connection if the intermediary networks are untrusted. Such a network tunnel may be implemented using a suitable tunneling protocol such as the Layer 2 Tunneling Protocol (L2TP).

Consumer network 404 includes consumer network node 412, which is also capable of communicating with one or more service provider network nodes in service provider network 400. As described above in relation to consumer network node 406, consumer network node 412 may be referred to as an edge node, or Consumer Edge device (CE). In embodiments, consumer network node 412 may comprise a host device, or a networking node which interfaces between one or more service provider network nodes in service provider network 400, and one or more further nodes in consumer network 404 (not shown), such as host devices and/or further networking nodes. In the embodiments shown in FIG. 4, consumer network node 412 is capable of communicating with service provider network node 408 via attachment circuit 414, and with service provider network node 416 via attachment circuit 418. Consumer network node 412 may therefore be referred to as being attached to both service provider network node 408 and service provider network node 416. This arrangement is also referred to as multi-homing, as consumer network node 412 may be referred to as being homed at both service provider network node 408 and service provider network node 416.

Attachment circuits 414 and 418 provide connectivity between consumer network node 412 and service provider network nodes 408 and 416 respectively. As described above in relation to attachment circuit 410, in embodiments, attachment circuits 414 and/or 418 may comprise direct physical links between consumer network node 412 and the respective service provider network node 408, 416, or they may traverse one or more intermediate networks (not shown), by utilizing a network tunnel for example.

Service provider network 400 comprises a plurality of service provider network nodes, including service provider network nodes 408 and 416. Service provider network nodes 408 and 416 are each capable of communicating with one or more consumer network nodes in one more consumer networks, such as consumer network nodes 406 and 412 in consumer networks 402 and 404. In the embodiments shown in FIG. 4, service provider network node 408 is capable of communicating with consumer network node 406 via attachment circuit 410, and with consumer network node 412 via attachment circuit 414, while service provider network node 416 is capable of communicating with consumer network node 412 via attachment circuit 418. In embodiments, service provider network nodes 408 and 416 may each be capable of communicating with one or more further consumer network nodes (not shown), which may be comprised within consumer networks 402, 404 or one or more further consumer networks (not shown).

Service provider network 400 provides interconnectivity between the various network nodes in service provider network 400, including service provider network nodes 408 and 416. In some embodiments, the connection between service provider network nodes 408 and 416 comprises a direct physical link. In further embodiments, the connection between service provider network nodes 408 and 416 may traverse one or more further nodes (not shown) in service provider network 400 and/or one or more further networks (not shown), such as the internet. In embodiments, the connection between service provider network nodes 408 and 416 comprises a network tunnel 420. Use of network tunnel 420 enables communication between consumer network node 406 and service provider network node 408 to traverse one or more intermediary nodes and/or networks while emulating a direct connection between the service provider nodes. Use of a network tunnel may additionally or alternatively provide a secure connection if one or more of the intermediary nodes and/or networks are untrusted. Such a network tunnel may be implemented using a suitable tunneling protocol such as the Layer 2 Tunneling Protocol (L2TP). In some arrangements, one or more further pseudowires (not shown) may additionally extend between service provider network node 408 and service provider network node 416 via network tunnel 420, for example to interconnect one or more further consumer network nodes (not shown) which are attached to service provider network node 408 and/or service provider network node 416.

As consumer network nodes 406 and 412 are both homed at service provider network node 408, connectivity between the consumer network nodes can be established by configuring local connection 422 at service provider network node 408. Local connection 422 provides connectivity between attachment circuit 410 and attachment circuit 414 at service provider network node 408, thereby providing connectivity between consumer network node 406 and consumer network node 412, via service provider network node 408. In embodiments, local connection 422 may be considered to comprise attachment circuits 410 and 414.

Connection 422 may be referred to as a local connection in so far as it is implemented locally, within service provider network node 408, without requiring configuration of further network nodes in service provider network 400. In some embodiments, local connection 422 is implemented as a switching rule at service provider network node 408. In the context of an IP network, such a switching rule may be referred to as a layer 2 local switching rule. Such a switching rule may also be referred to as a forwarding rule, particularly in embodiments where service provider network 400 comprises an MPLS network. Local connection 422 may also be referred to as a hairpin cross-connect, or pair of hairpin cross-connects.

In embodiments, local connection 422 may be implemented through configuration of a pair of 'cross-connects' or 'forwarders' at service provider network node 408. Such cross-connects may be used to bind attachment circuit 410 to attachment circuit 414, for example via the particular physical or virtual interface or 'port' of service provider network node 408 to which the respective attachment circuit is connected. A first cross-connect may be responsible for forwarding traffic, such as data traffic, received from the attachment circuit 410 onto attachment circuit 414, while a second cross-connect may be responsible for forwarding data traffic received from attachment circuit 414 onto the attachment circuit 410.

According to embodiments, in order to provide connectivity protection for local connection 422, the multi-homed arrangement of consumer network node 412 is leveraged to configure a second, remote connection between consumer network node 406 and consumer network node 412. The remote connection comprises pseudowire 424, which is established between service provider network node 408 and service provider network node 416. In embodiments, pseudowire 424 is established via network tunnel 420 between provider network node 408 and service provider network node 416. Pseudowire 424 connects attachment circuit 410 to attachment circuit 418, via service provider network nodes 408 and 416. Therefore, the remote connection provides connectivity between consumer network node 406 and consumer network node 412, via service provider network nodes 408 and 416. In embodiments, the remote connection may be considered to comprise attachment circuits 410 and 418. This second connection may be referred to as a remote connection in so far as it is implemented not only within service provider network node 408, but also at the remote service provider network node 416. In embodiments, the remote connection may also require configuration of one or more further network nodes (not shown), such as intermediate nodes in service provider network 400.

Pseudowire 424 comprises an emulated direct connection between service provider network node 408 and service provider network node 416. In embodiments, pseudowire 424 is bound to attachment circuit 410 at service provider network node 408, for example via a particular physical or virtual interface or 'port' of service provider network node 408. At service provider network node 412, pseudowire 424 may be similarly bound to attachment circuit 418. Data traffic arriving at one of service provider network nodes 408 and 416 via the respective attachment circuit 410, 418 is therefore forwarded onto pseudowire 424 towards the other of service provider network nodes 416 and 408. Similarly, data traffic arriving at service provider network node 408 or 416 via pseudowire 424 is forwarded onto the respective attachment circuit 410, 418 towards the respective consumer network node 406, 412.

In embodiments, a pseudowire label is applied to data traffic by the service provider network nodes 408, 416 prior to forwarding onto pseudowire 424 in order to ensure correct routing of the data traffic through service provider network 400. In embodiments in which network tunnel 420 is used to interconnect service provider network nodes 408 and 416, a tunnel label may also be applied to data traffic by service provider network nodes 408, 416 prior to forwarding onto pseudowire 424. In embodiments in which service provider network 400 comprises an MPLS network, one or more of the pseudowire labels and the tunnel labels may comprise MPLS labels. The pseudowire and/or tunnel labels of data traffic received at service provider network nodes 408 and 416 via pseudowire 424 may be conversely stripped (i.e. removed) by the respective service provider network node 408, 416 prior to forwarding the data traffic onto the corresponding attachment circuit 410, 418.

In embodiments, the bindings between attachment circuits 410, 418 and pseudowire 424 are implemented through configuration of a pair of 'cross-connects' or 'forwarders' at the respective service provider network node. At each service provider network node 408, 416, a first cross-connect may be responsible for forwarding data traffic received from the respective attachment circuit 410, 418 onto pseudowire 424, as well as applying any appropriate labels to the data traffic. Similarly, a second cross-connect may be responsible for forwarding data traffic received from pseudowire 424 onto the respective attachment circuit 410, 418, as well as stripping any appropriate labels from the data traffic.

Hence, the relative merits of local connection 422 for interconnecting two consumer network nodes 406, 412 that are homed at the same service provider network node 408 can be seen. For example, configuration of local connection 422 can be performed within a single service provider network node 408, and does not require the complexity of label switching, or the configuration of multiple service provider network nodes. However, by arranging one of the two consumer network nodes 406, 412 which are connected via local connection 422 such that it is homed at a plurality of interconnected service provider network nodes 408, 416, a remote connection between the same two consumer network nodes 406, 412 can be configured to provide connection redundancy. In the embodiments shown in FIG. 4, the combination of local connection 422, and the remote connection which includes pseudowire 424, provide redundant connectivity between consumer network nodes 406 and 412 via service provider network 400. Embodiments therefore provide redundant connectivity for a set of connections which include a local, or 'hairpinned' connection. Hence, if a loss in connectivity between consumer network nodes 406 and 412 is detected while one of the connections is being used to transfer data traffic between consumer network nodes 406 and 412, it may be possible to continue transmitting data traffic between the consumer network nodes using the other connection, as discussed in further detail below.

In embodiments, one of the local connection and the remote connection comprises a primary connection, and the other of the local connection and the remote connection comprises a backup connection. In such embodiments, the primary connection is used to transfer (or 'route') data traffic between consumer network nodes 406 and 412, until a loss in connectivity is detected via the primary connection. In response to detection of a loss in connectivity via the primary connection, the backup connection is then used to transfer data traffic between consumer network nodes 406 and 412. In some such embodiments, the attachment circuits 414, 418 connected to the multi-homed consumer network node 412, may comprise a primary attachment circuit associated with the primary connection, and a backup attachment circuit associated with the backup connection. In some embodiments, if the detected loss of connectivity is restored, the primary connection can again be used to transfer data between consumer network nodes 406 and 412. Hence in embodiments, if a restoration of connectivity between consumer network nodes 406 and 412 via the primary connection is detected while a backup connection is being used to transfer data traffic between consumer network nodes 406 and 412, the primary connection is then used to continue transmitting data traffic between the consumer network nodes.

In embodiments, the primary connection comprises local connection 422. Such embodiments may provide a more efficient use of network resources, as less data traffic is transmitted between service provider network nodes 408 and 416 when local connection 422 is available. Hence, embodiments enable protection for a local connection to be provided in a VPWS, by configuring a backup remote connection which includes a pseudowire. Hence, in embodiments, in contrast to conventional VPWS systems, hairpinned connections do not necessarily constitute a single point of failure for the connected consumer network nodes.

In embodiments where local connection 422 is configured as the primary connection, use of the backup remote connection comprising pseudowire 424 protects the connectivity between consumer network nodes 406 and 412 against a loss in connectivity associated with attachment circuit 414 for example. If such a loss in connectivity occurs, the effects can be mitigated by instead transferring data traffic between consumer network nodes 406 and 412 via the backup remote connection which includes pseudowire 424, as the remote connection does not comprise or utilize attachment circuit 414. In such embodiments, attachment circuit 414 is the primary attachment circuit for consumer network node 412, whereas attachment circuit 418 is a backup attachment circuit for consumer network node 412. In alternative embodiments, the remote connection comprising pseudowire 424 may be configured as the primary connection, with local connection 422 configured as a backup connection. In such embodiments, the use of backup local connection 422 protects the connectivity between consumer network nodes 406 and 412 against a loss in connectivity associated with attachment circuit 418, service provider network node 416, tunnel 420 or pseudowire 424, for example.

In embodiments, the detected loss in connectivity may comprise a total loss in connectivity in which no data traffic can be transferred via a given connection. In further embodiments, the detected loss in connectivity may comprise a partial loss, or degradation in connectivity, in which some data traffic may still be transferred via the given connection. Such a partial loss in connectivity may comprise a reduction in bandwidth via the given connection, a reduction in connection speed via the given connection, or a reduction in connection quality via the given connection, such as an increase in packet loss for example.

In some arrangements, a plurality of remote connections between consumer network nodes 406 and 412 may be configured. In embodiments, each of the remote connections traverses service provider network 400 via a different path. For example, each remote connection may comprise a different pseudowire, each of which extends between consumer network node 406 and consumer network node 412 via a different combination of service provider network nodes (which may include one or more further service provider network nodes connected to one or more of consumer network nodes 406 and 412; not shown). Such a plurality of remote connections enables multiple backup connections to be defined for the connection between consumer network nodes 406 and 412, thereby increasing the resilience of the connection to different, or multiple, points of failure. In some embodiments, the concept of a pseudowire set may be extended to incorporate local connection 422, as well as the one or more remote connections. In embodiments, the primary connection is preconfigured in service provider network 100. In some embodiments, one or more of the backup connections are preconfigured in service provider network 400. In such embodiments, the configuration, which may include various cross-connects, forwarding rules and the like, is inactive until the connection is used to transfer data traffic. In further embodiments, one or more of the backup connections are configured dynamically in response to detecting a loss in connectivity on the primary connection.

Figure 5:
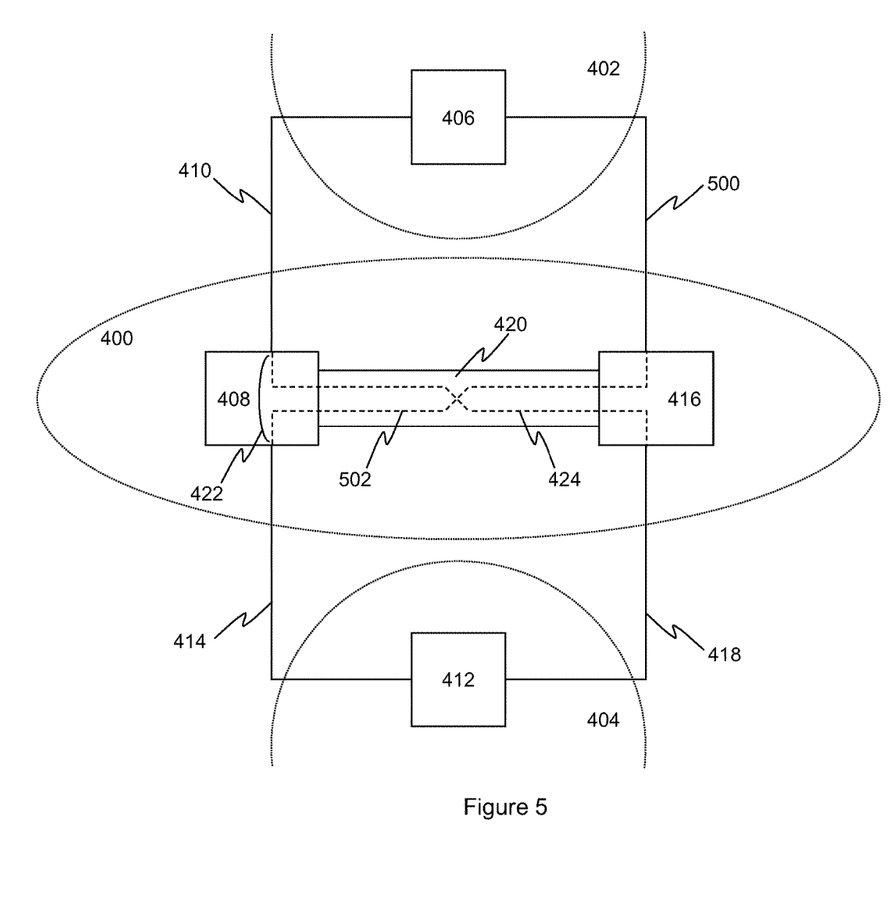
FIG. 5 shows a further example implementation of a virtual private wire service according to one or more embodiments of the present invention.

FIG. 5 shows an example implementation of a VPWS according to embodiments. Entities 400 to 424 of FIG. 5 are substantially as described previously in relation to FIG. 4, except as described otherwise below. In the embodiments depicted in FIG. 5, consumer network node 406 is further connected to service provider network node 416 via attachment circuit 500. The availability of attachment circuit 500 enables a further remote connection to be configured between consumer network nodes 408 and 416, which includes pseudowire 502. Pseudowire 502 is established between service provider network node 408 and service provider network node 416. In embodiments, pseudowire 502 is established via network tunnel 420 between service provider network node 408 and service provider network node 416. Pseudowire 502 connects attachment circuit 414 to attachment circuit 500, via service provider network nodes 408 and 416. Therefore, the further remote connection provides additional redundant connectivity between consumer network node 406 and consumer network node 412, via service provider network nodes 408 and 416. In embodiments, the further remote connection may be considered to comprise attachment circuits 410 and 418.

In embodiments, local connection 422, the remote connection which comprises pseudowire 420, and the further remote connection which comprises pseudowire 502, are all comprised within a set of connections which provide redundant connectivity between consumer network nodes 406 and 412. In some embodiments, local connection 422 comprises the primary connection, whereas the two remote connections are configured as backup connections. Addition of the further remote connection which comprises pseudowire 502 as a backup connection additionally protects the connectivity between consumer network nodes 406 and 412 against a loss in connectivity associated with attachment circuit 410 for example, or a simultaneous loss in connectivity associated with attachment circuits 410 and 418. If such a loss in connectivity occurs, the effects can be mitigated by instead transferring data traffic between consumer network nodes 406 and 412 via the backup remote connection which includes pseudowire 502, as the remote connection does not comprise or utilize attachment circuits 410 or 418. In such embodiments, attachment circuit 410 is the primary attachment circuit for consumer network node 406, whereas attachment circuit 500 is a backup attachment circuit for consumer network node 406.

In the embodiments depicted in FIG. 5, if a loss in connectivity occurs that is associated with either attachment circuit 410 or attachment circuit 414, one of the backup remote connections is then used to transfer data between consumer network nodes 406 and 412. However, in the embodiments depicted in FIG. 5, consumer network nodes 406 and 412 are also both homed at service provider network node 416. Therefore, in such scenarios, further configuration of service provider network 400 provides a more efficient use of network resources, which requires less data traffic to be transferred between service provider network nodes 408 and 416 across service provider network 400.

Figure 6:
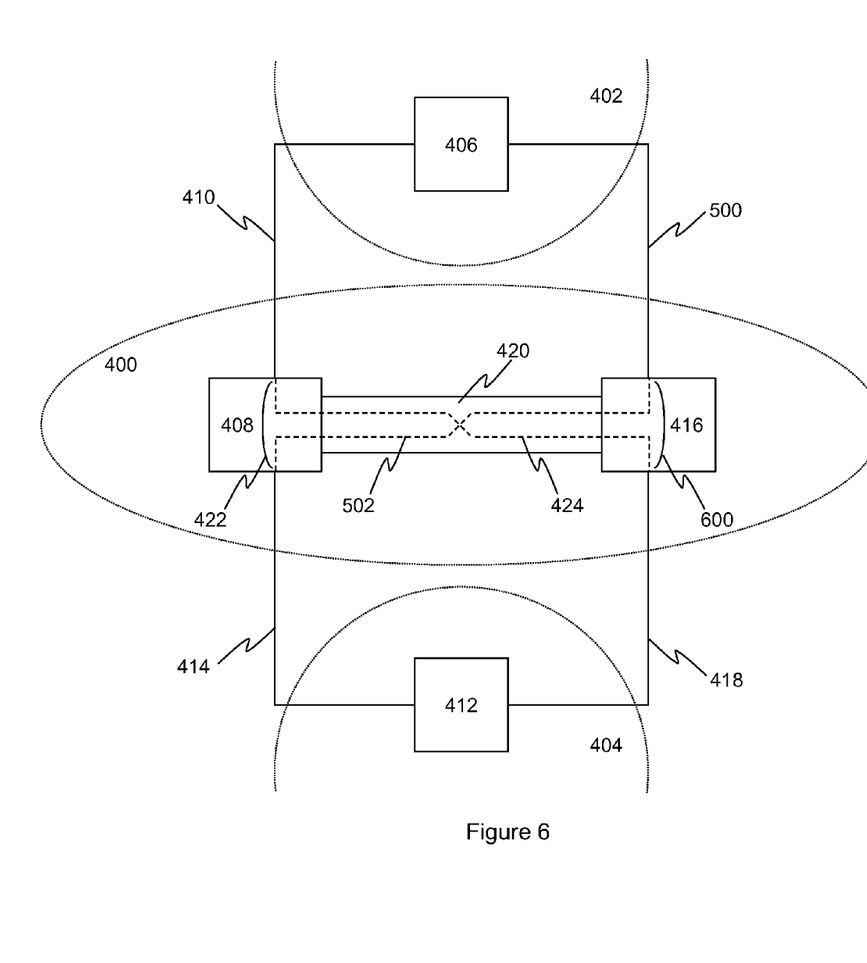
FIG. 6 shows a yet further example implementation of a virtual private wire service according to one or more embodiments of the present invention.

FIG. 6 shows an example implementation of a VPWS according to embodiments. Entities 400 to 502 of FIG. 6 are substantially as described previously in relation to FIGS. 4 and 5, except as described otherwise below. In the embodiments depicted in FIG. 6, a loss in connectivity via local connection 422 has been previously detected, for example due to a fault associated with one of attachment circuit 410 or 414, and one of the backup remote connections comprising pseudowire 424 or 502 is being used to transfer data between consumer network nodes 406 and 412. In the embodiments depicted in FIG. 6, in response to determining that consumer network nodes 406 and 412 are both also homed at service provider network node 416, i.e. that consumer network nodes 406 and 412 are both connected to service provider network node 416 via attachment circuits 500 and 418 respectively, a further local connection 600 is established at service provider network node 416, which provides connectivity between attachment circuit 500 and attachment circuit 418. Hence, local connection 600 provides connectivity between consumer network node 406 and consumer network node 412, via service provider network node 416. In embodiments, local connection 600 may be considered to comprise attachment circuits 500 and 418. In embodiments, in response to determining that consumer network nodes 406 and 412 are both also homed at service provider network node 416, data traffic is then routed between consumer network nodes 406 and 412 via local connection 600.

In the embodiments described above in relation to FIG. 6, local connection 600 is established subsequent to detecting a loss of connectivity via primary local connection 422, in response to determining that consumer network nodes 406 and 412 are both also homed at service provider network node 416. In further embodiments, local connection 600 is preconfigured as an alternative backup connection, which is inactive until a loss of connectivity is detected via the primary connection. In some embodiments, the determination that consumer network nodes 406 and 412 are both homed at service provider network node 416 takes place after some data traffic has been transferred via one of backup remote connections. In alternative embodiments, the determination that consumer network nodes 406 and 412 are both homed at service provider network node 416 takes place before data traffic is transferred via a backup remote connection, in which case use of such a remote connection may be avoided by moving directly to use of local connection 600 as a backup for the primary connection. In some such embodiments, a set of redundant connections between consumer network nodes 406 and 412 is configured, which includes a plurality of local connections.

One or more of the aspects of the embodiments described herein with reference to the drawings comprise processes performed by one or more service provider network nodes 408, 416. In embodiments, the one or more service provider network nodes 408, 416 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of providing connectivity between a first consumer network node and a second consumer network node via a service provider network, the method comprising:
    transferring traffic via a local connection between the first consumer network node and the second consumer network node,
        wherein the local connection is established at a first service provider network node in the service provider network,
        wherein the first consumer network node is in a first consumer network and is connected to the first service provider network node by a first attachment circuit, wherein the second consumer network node is in a second consumer network and is connected to the first service provider network node by a second attachment circuit,
wherein the local connection comprises a hairpin cross-connect at the first service provider network node,
and wherein the second consumer network is different from the first consumer network;
detecting a loss in connectivity of the local connection between the first consumer network node and the second consumer network node; and
in response to detecting the loss in connectivity, transferring traffic, via a remote connection, between the first consumer network node and the second consumer network node,
wherein the remote connection comprises a pseudowire established between the first service provider network node and a second service provider network node in the service provider network, and
wherein the second consumer network node is connected to the second service provider network node via a third attachment circuit.

2. The method of claim 1, wherein the local connection comprises a binding between the first attachment circuit and the second attachment circuit at the first service provider network node.

3. The method of claim 1, wherein the local connection comprises one or more of:
a packet forwarding rule at the first service provider network node, and
a layer 2 local switching rule at the first service provider network node.

4. The method of claim 1, wherein the local connection comprises the first attachment circuit and the second attachment circuit.

5. The method of claim 1, wherein the remote connection comprises the first attachment circuit and the third attachment circuit.

6. The method of claim 1, wherein the local connection and the remote connection provide redundant connectivity between the first consumer network node and the second consumer network node.

7. The method of claim 1, wherein the local connection comprises a primary connection between the first consumer network node and the second consumer network node, and the remote connection comprises a back-up connection between the first consumer network node and the second consumer network node.

8. The method of claim 1, wherein redundant connectivity between the first consumer network node and the second consumer network node is provided by a set of connections comprising at least the local connection and the remote connection.

9. The method of claim 8, wherein the set of connections comprises one or more further connections.

10. The method of claim 1, wherein one or more of the local connection and the remote connection are preconfigured in the service provider network, or
the method comprises configuring the remote connection in response to detecting the loss in connectivity.

11. The method of claim 1, wherein the loss in connectivity comprises a partial loss in connectivity, or
wherein the loss in connectivity comprises a complete loss of connectivity.

12. The method of claim 11, wherein the partial loss in connectivity comprises one or more of:
a reduction in connection quality via the local connection,
a reduction in bandwidth via the local connection, and
a reduction in connection speed via the local connection.

13. The method of claim 1, wherein the loss in connectivity comprises a loss in connectivity in the second attachment circuit.

14. The method of claim 1, wherein one or more of the first consumer network node and the second consumer network node comprise Customer Edge devices (CEs), and/or
wherein one or more of the first consumer network node and the second consumer network node are comprised within a consumer network, and/or
wherein one or more of the first consumer network node and the second consumer network node comprise a host or router in a consumer network.

15. The method of claim 1, wherein the second consumer network node is multi-homed at the first service provider network node and the second provider network node, and/or
wherein the first consumer network node and the second consumer network node are homed at the second service provider network node, and/or
wherein one or more of the first service provider network node and the second service provider network node comprise Provider Edge devices (PEs), and/or
wherein one or more of the first service provider network node and the second service provider network node comprise a router in the service provider network.

16. The method of claim 1, wherein the service provider network comprises one or more of:
a packet switched network,
an Internet Protocol (IP) network, and
a Multiprotocol Label Switching (MPLS) network.

17. The method of claim 1, comprising:
subsequent to detecting the loss in connectivity, determining that the first consumer network node is connected to the second service provider network node via a fourth attachment circuit, and
in response to the determination, transferring traffic between the first consumer network node and the second consumer network node via a further local connection established at the second service provider network node.

18. The method of claim 17, wherein the further local connection comprises the third attachment circuit and the fourth attachment circuit.

19. The method of claim 17, comprising configuring the further local connection in response to the determination.

20. The method of claim 1, comprising:
subsequent to detecting the loss in connectivity, detecting a restoration of connectivity between the first consumer network node and the second consumer network node via the local connection; and
in response to detecting the restoration of connectivity, transferring traffic between the first consumer network node and the second consumer network node via the local connection.

21. A system for use in providing connectivity between a first consumer network node and a second consumer network node via one or more service provider network nodes comprised within a service provider network, the system comprising:
at least one memory including computer program code; and
at least one processor in data communication with the at least one memory, wherein the at least one processor is configured to:

transfer traffic via a local connection between the first consumer network node and the second consumer network node,
  wherein the local connection is established at a first service provider network node in the service provider network,
  wherein the first consumer network node is in a first consumer network and is connected to the first service provider network node by a first attachment circuit, and
  wherein the second consumer network node is in a second consumer network and is connected to the first service provider network node by a second attachment circuit,
  wherein the local connection comprises a hairpin cross-connect at the first service provider network node,
and wherein the second consumer network is different from the first consumer network;
detect a loss in connectivity of the local connection between the first consumer network node and the second consumer network node; and
in response to detecting the loss in connectivity, transfer traffic, via a remote connection, between the first consumer network node and the second consumer network node,
  wherein the remote connection comprises a pseudowire established between the first service provider network node and a second service provider network node in the service provider network, and
  wherein the second consumer network node is connected to the second service provider network node via a third attachment circuit.

22. A non-transitory computer-readable storage medium comprising computer-executable instructions which, when executed by a processor, cause a computing device to perform a method of providing connectivity between a first consumer network node and a second consumer network node via a service provider network, the method comprising:
  transferring traffic via a local connection between the first consumer network node and the second consumer network node,
    wherein the local connection is established at a first service provider network node in the service provider network,
    wherein the first consumer network node is in a first consumer network and is connected to the first service provider network node by a first attachment circuit,
    wherein the second consumer network node is in a second consumer network and is connected to the first service provider network node by a second attachment circuit,
    wherein the local connection comprises a hairpin cross-connect at the first service provider network node,
    and wherein the second consumer network is different from the first consumer network;
  detecting a loss in connectivity of the local connection between the first consumer network node and the second consumer network node; and
  in response to detecting the loss in connectivity, transferring traffic, via a remote connection, between the first consumer network node and the second consumer network node,
    wherein the remote connection comprises a pseudowire established between the first service provider network node and a second service provider network node in the service provider network, and
    wherein the second consumer network node is connected to the second service provider network node via a third attachment circuit.

23. A system for use in providing connectivity between a first consumer network node and a second consumer network node via a service provider network, the system comprising:
  a first service provider network node, the first service provider network node being attached to the first consumer network node via a first attachment circuit, and attached to the second consumer network node via a second attachment circuit;
  a second service provider network node, the second service provider network node being attached to the first consumer network node via a third attachment circuit;
  at least one memory including computer program code; and
  at least one processor in data communication with the at least one memory, wherein the at least one processor is configured to:
  provide a local connection, at the first service provider network node, between the first consumer network node and the second consumer network node,
    wherein the local connection comprises a hairpin cross-connect at the first service provider network node,
    wherein the first consumer network node is in a first consumer network, and
    wherein the second consumer network node is in a second, different consumer network;
  provide at least one remote connection between the first consumer network node and the second consumer network node, the remote connection comprising a pseudowire connection established between the first service provider network node and the second service provider network node,
  wherein the local connection and the at least one remote connection are configured to provide redundant connectivity between the first consumer network node and the second consumer network node.

* * * * *